United States Patent [19]

Kudo et al.

[11] Patent Number: 5,657,186

[45] Date of Patent: Aug. 12, 1997

[54] DEVICE FOR SUPPORTING A MAGNETIC HEAD SLIDER AND MAGNETIC HEAD APPARATUS PROVIDED WITH THE DEVICE INCLUDING GROUNDING ELECTRICAL CONNECTION

[75] Inventors: Shunichi Kudo; Masashi Shiraishi, both of Nagano, Japan

[73] Assignees: TDK Corporation, Tokyo; NHK Spring Co., Ltd., Yokohama, both of Japan

[21] Appl. No.: 518,842

[22] Filed: Aug. 24, 1995

[30] Foreign Application Priority Data

Sep. 1, 1994 [JP] Japan ................................ 6-230226

[51] Int. Cl.⁶ .................................................. G11B 5/48
[52] U.S. Cl. .................................................. 360/104
[58] Field of Search ............................ 360/104, 106, 360/103

[56] References Cited

U.S. PATENT DOCUMENTS

| 4,761,699 | 8/1988 | Ainslie ......................... 360/104 |
| 4,996,623 | 2/1991 | Erpelding et al. .............. 360/104 |
| 5,121,273 | 6/1992 | Slezak ......................... 360/104 |

FOREIGN PATENT DOCUMENTS

| 53-30310 | 3/1978 | Japan . |
| 53-30311 | 3/1978 | Japan . |
| 55-150130 | 11/1980 | Japan . |
| 60-136911 | 7/1985 | Japan . |
| 60-246015 | 12/1985 | Japan . |
| 61-170113 | 10/1986 | Japan . |
| 62-75986 | 4/1987 | Japan . |
| 2-61810 | 3/1990 | Japan . |
| 2-244419 | 9/1990 | Japan . |
| 3-238616 | 10/1991 | Japan . |
| 4-40680 | 2/1992 | Japan . |
| 4-219618 | 8/1992 | Japan . |
| 6-215513 | 8/1994 | Japan . |

*Primary Examiner*—A. J. Heinz
*Attorney, Agent, or Firm*—Nikaido, Marmelstein, Murray & Oram LLP

[57] ABSTRACT

A support device for supporting a magnetic head slider includes a support member (30) for supporting the magnetic head slider having a trailing surface on which at least one magnetic head transducer and a plurality of signal terminals connected to the transducer are formed, a wiring substrate (32) having a plurality of signal lead conductors (34a, 34b, 34c, 34d) to be electrically connected to the signal terminals of the magnetic head slider, the wiring substrate being formed on the support member, and a grounding electrode (35) formed on the wiring substrate, to be grounded and to be electrically connected to the magnetic head slider.

9 Claims, 7 Drawing Sheets

DEVICE FOR SUPPORTING A MAGNETIC HEAD SLIDER AND MAGNETIC HEAD APPARATUS PROVIDED WITH THE DEVICE INCLUDING GROUNDING ELECTRICAL CONNECTION

FIELD OF THE INVENTION

The present invention relates to a device for supporting a flying magnetic head slider and to a magnetic head apparatus including the support device. Particularly, the present invention relates to a support device for supporting a flying magnetic head slider having at least one magnetic head transducer and to a magnetic head apparatus which is provided with a structure for grounding the slider to prevent the magnetic head transducer from a possible electrostatic breakdown.

DESCRIPTION OF THE RELATED ART

Static electricity may be sometimes induced on a thin-film magnetic head slider flying above a rotating magnetic disk. During a Constant Start and Stop (CSS) operation of the magnetic head slider, an air bearing surface of the slider will contact to and slide on the rotating disk surface resulting the static electricity to induce. In addition, the slider in operation will keep a quite small flying height with respect to the surface of the magnetic disk rotating at a high speed also resulting the static electricity to induce.

In order to prevent magnetic head transducers from being broken down by the induced static electricity, many of magnetic head apparatuses have structures for grounding their magnetic head sliders by electrically conducting the slider body with metallic suspensions which support the sliders (for example, Japanese Patent Unexamined Publication Nos. 2(1990)-61810 and 2(1990)-244419).

FIG. 1 shows a side view of a part of a known magnetic head apparatus described in the above-mentioned Japanese Patent Unexamined Publication No. 2(1990)-61810.

In the figure, a reference numeral 10 denotes the top end portion of a suspension made of metal and 11 denotes a gimbal also made of metal and attached to the top end of the suspension 10. A magnetic head slider 12 made of a conductive material is bonded to the gimbal 11 by means of an adhesive resin 13. Between the adhesive surface of the slider 12 and the gimbal 11, not only the adhesive resin 13 which will be made of non-conductive material but also a conductive resin 14 such as a silver paste is partially formed so that the slider 12 conducts with the gimbal 11. Since the base end portion of the suspension 10 is grounded through a metal housing of a disk drive unit (not shown), the slider 12 is also grounded.

FIG. 2 shows a side view of a part of an another known magnetic head apparatus described in the above-mentioned Japanese Patent Unexamined Publication No. 2(1990)-244419.

In the figure, a reference numeral 20 denotes the top end portion of a suspension made of metal and 21 denotes a gimbal also made of metal and attached to the top portion of the suspension 20. A magnetic head slider 22 made of a conductive material is bonded to the gimbal 21 by means of an adhesive resin made of non-conductive material. Between the side face of the slider 22 and the surface of the gimbal 21, a conductive resin 24 such as a silver paste is partially formed so that the slider 22 conducts with the gimbal 21. Since the base end portion of the suspension 20 is grounded through a metal housing of a disk drive unit (not shown), the slider 22 is also grounded.

However, since the conventional magnetic head apparatus shown in FIG. 1 has the conductive resin 14 partially formed between the adhesive surface of the slider 12 and the gimbal 11, mechanical strength of bonding at the adhesive surface of the slider 12 is lowered. Also, due to this partially formed conductive resin, a plane shape (or a projected or recessed crown shape) of an air bearing surface of the slider 12 may be deformed causing flying characteristics of this slider 12 to deteriorate.

Furthermore, such the conventional magnetic head apparatuses shown in FIGS. 1 and 2, which utilize their suspensions as grounding conductors can be assembled only by a metal suspension but cannot be assembled by a suspension made of insulating material.

There is an another known magnetic head apparatus having a suspension for supporting a magnetic head slider and a flexible wiring substrate provided with lead lines which are connected to a magnetic head transducer formed on the slider (for example, Japanese Utility Model Unexamined Publication No. 61(1986)-170113). In such the apparatus, the wiring substrate must be attached to the suspension at a position other than a portion where the conductive resin for electrically connecting the slider with the suspension is formed. Thus, in this apparatus, the wiring substrate has to be mounted on the opposite surface of the suspension with respect to the surface to which the magnetic head slider is attached. This will considerably restrict the design and arrangement of the wiring substrate.

SUMMARY OF THE INVENTION

It is therefore an object of the present invention to provide a device for supporting a magnetic head slider and a magnetic head apparatus provided with the support device, whereby the magnetic head slider can be extremely easily grounded even if a support member such as a suspension for supporting the slider is made of insulating material.

Another object of the present invention is to provide a device for supporting a magnetic head slider and a magnetic head apparatus provided with the support device, whereby the magnetic head slider can be fixed to the support device with a sufficient mechanical strength of bonding.

Still another object of the present invention is to provide a device for supporting a magnetic head slider and a magnetic head apparatus provided with the support device, whereby arrangement of a wiring substrate can be more freely determined.

According to the present invention, a support device for supporting a magnetic head slider and a magnetic head apparatus with the support device are provided.

The support device includes a support member for supporting the magnetic head slider having a trailing surface on which at least one magnetic head transducer and a plurality of signal terminals connected to the transducer are formed, a wiring substrate having a plurality of signal lead conductors to be electrically connected to the signal terminals of the magnetic head slider, which wiring substrate is formed on the support member, and a grounding electrode formed on the wiring substrate, to be grounded and to be electrically connected to the magnetic head slider.

The magnetic head apparatus includes a magnetic head slider having a trailing surface on which at least one magnetic head transducer and a plurality of signal terminals connected to the transducer are formed, a support member for supporting the magnetic head slider, and a wiring substrate having a plurality of signal lead conductors electrically connected to the signal terminals of the magnetic head slider. The wiring substrate is formed on the support member, and the magnetic slider is mounted on the wiring substrate. The apparatus further includes a grounding electrode formed on the wiring substrate. This grounding electrode is grounded and electrically connected to the magnetic head slider.

Since the grounding electrode electrically connected or to be electrically connected to the magnetic head slider is formed on the wiring substrate which is formed on the support member such as a suspension for supporting the magnetic head slider, the magnetic head slider can be extremely easily grounded via the grounding electrode and the support member if the support member is made of conductive material. Even if the support member is made of insulating material, the magnetic head slider can be easily grounded via the grounding electrode and a grounding conductor which will be formed in the wiring substrate.

Furthermore, since the grounding electrode is arranged at a predetermined position of the wiring substrate, the magnetic head slider can be fixed to the support member and can be grounded without lying conductive resin on the adhesive surface of the slider causing the mechanical strength of bonding of the slider to extremely increase. Also, since the wiring substrate can be positioned between the support member and the slider, arrangement of the wiring substrate will be more freely determined resulting the design of the wiring substrate to become easier.

It is preferred that at least a part of the support member is constituted by a grounded metal portion, and that the grounding electrode is electrically connected to the grounded metal portion.

Preferably, the wiring substrate includes a grounding lead conductor, one end of which is connected to the grounding electrode and the other end thereof is grounded at the base end portion of the support member. Thus, even if the support member is made of insulating material, the magnetic head slider can be easily grounded via the grounding electrode and the grounding lead conductor.

It is also preferred that the magnetic head slider has a plurality of side surfaces other than the trailing surface, and that the grounding electrode is arranged at a position near one of the side surfaces of the magnetic head slider. In this case, the grounding electrode may be arranged so that at least a part of the grounding electrode is appeared outside the above-mentioned one side surface of the slider, and this appeared part of the grounding electrode is electrically connected to the one side surface of the slider.

Preferably, the magnetic head slider has a grounding terminal formed on the trailing surface and electrically connected to the slider, and the grounding electrode is arranged at a position near the grounding terminal of the magnetic head slider.

Further objects and advantages of the present invention will be apparent from the following description of the preferred embodiments of the invention as illustrated in the accompanying drawings.

DESCRIPTION OF THE PREFERRED EMBODIMENTS

Figure 1:
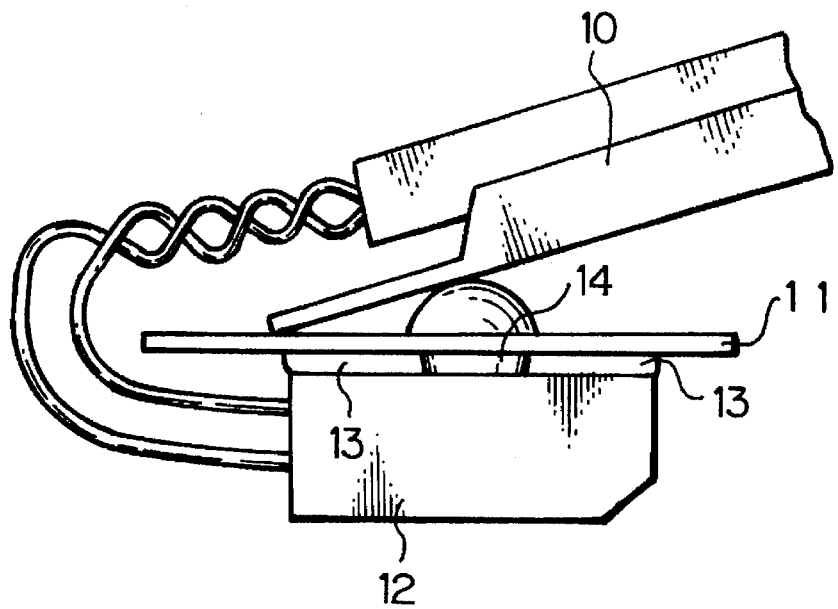
FIG. 1 is a side view showing a part of the known magnetic head apparatus already described.
Figure 2:
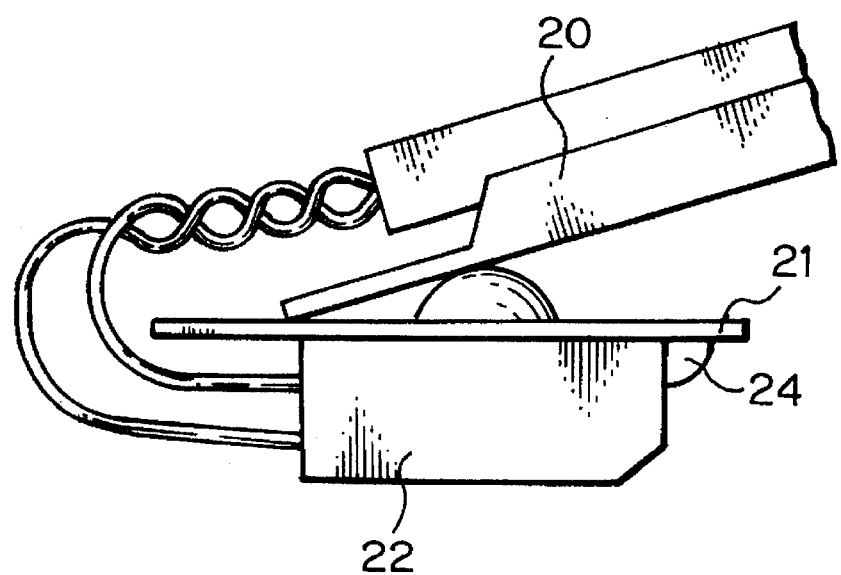
FIG. 2 is a side view showing a part of the another known magnetic head apparatus already described.
Figure 3:
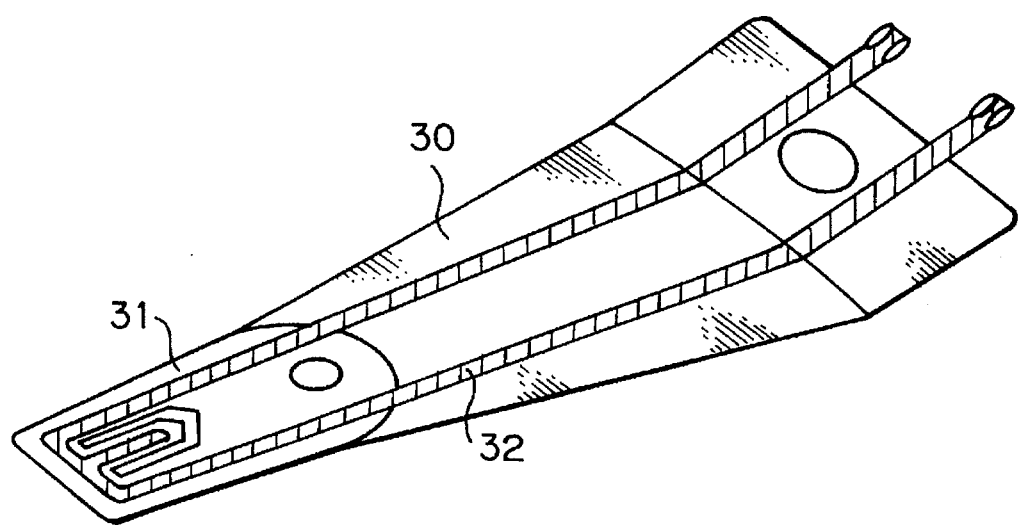
FIG. 3 is an oblique view schematically showing a preferred embodiment of a device for supporting a magnetic head slider according to the present invention.

FIG. 3 is an oblique view schematically illustrating a preferred embodiment of a device for supporting a magnetic head slider according to the present invention.

In the figure, a reference numeral 30 denotes a resilient suspension and 31 denotes a gimbal which is formed as a top end portion of the suspension 30. The suspension 30 integral with the gimbal 31 constitutes a support member for supporting a magnetic head slider according to the present invention and is made of, in this embodiment, metal such as stainless steel (for example SUS304TA). The suspension 30 can be made of various resilient metals other than the stainless steel. The base end portion of the suspension 30 is grounded through a metal housing of a disk drive unit (not shown). A flexible wiring substrate 32 is formed and mounted on the suspension 30.

Figure 4:
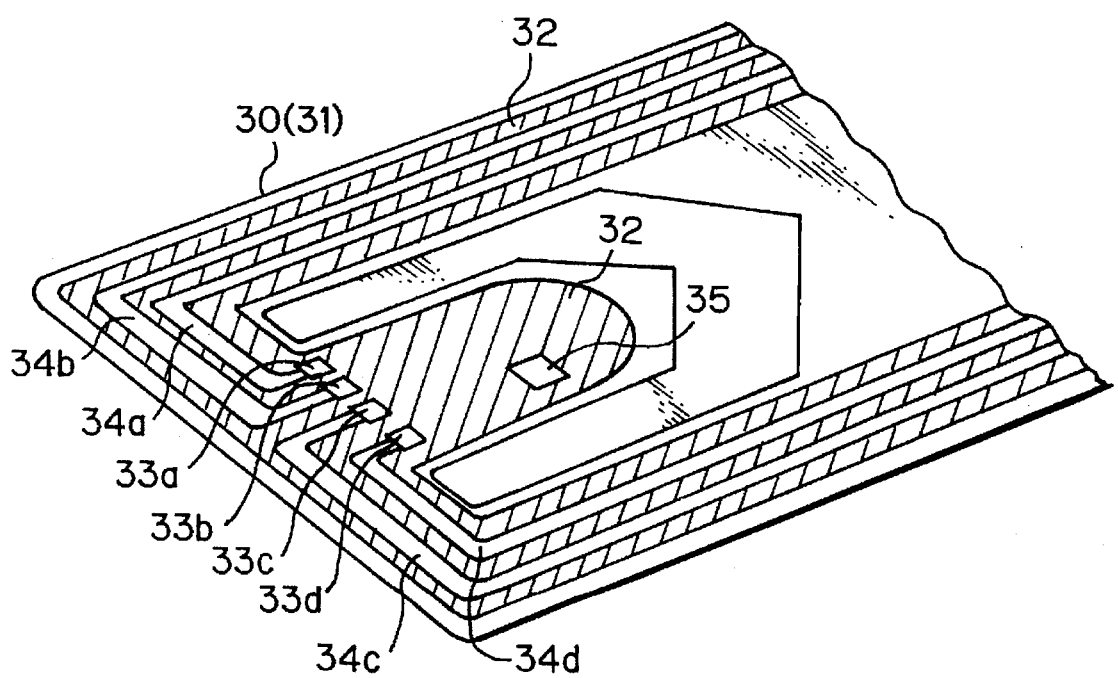
FIG. 4 is an enlarged view showing a top end portion of a suspension and a flexible wiring substrate in the embodiment of FIG. 3.

FIG. 4 is an enlarged view showing the top end portion of the suspension 30 and the flexible wiring substrate 32 shown in FIG. 3.

In FIG. 4, reference numerals 33a to 33d denote signal electrodes whose upper ends are exposed from the upper surface of the flexible wiring substrate 32, 34a to 34d denote signal lead conductors formed within the substrate 32, and 35 denotes a grounding electrode. The upper end of the grounding electrode 35 is exposed from the upper surface of the substrate 32 and the bottom end of the grounding electrode 38 is electrically connected to the metallic suspension 30. One ends of the signal lead conductors 34a to 34d are electrically connected to lower ends of the signal electrodes 33a to 33d, respectively. The other ends of the lead conductors 34a to 34d are extended to the base end portion of the suspension 30 and electrically connected to signal terminals of a magnetic disk drive unit (not shown).

Figure 5:
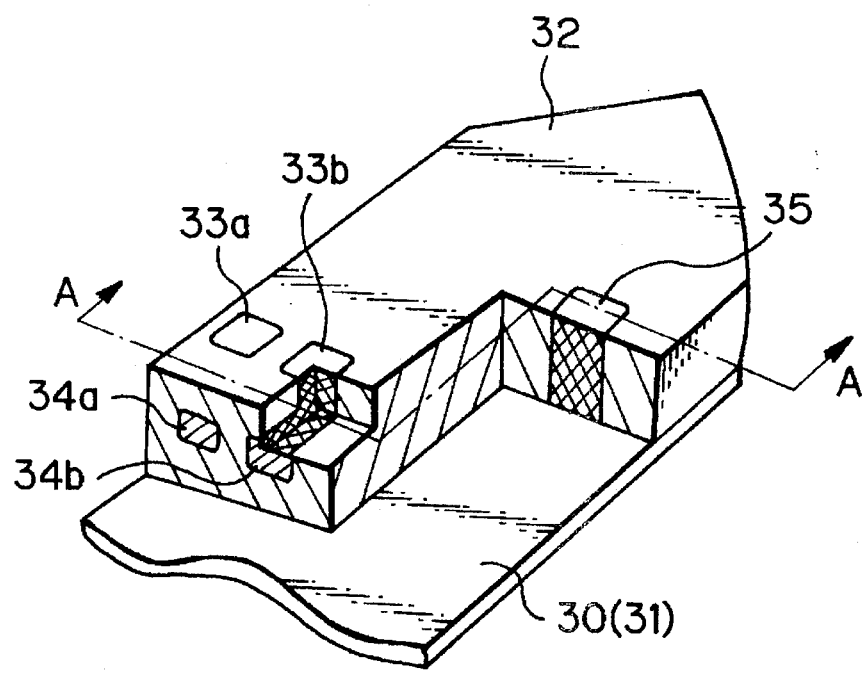
FIG. 5 is a partially broken oblique view showing the top end portion of the flexible wiring substrate in the embodiment of FIG. 3.
Figure 6:
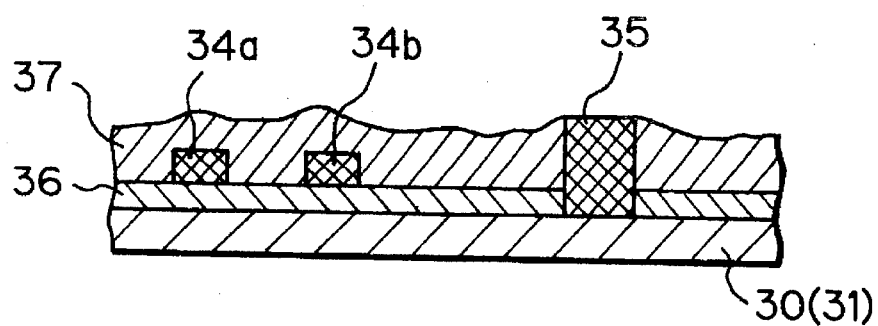
FIG. 6 is an A—A line sectional view of FIG. 5.

FIG. 5 is a partially broken oblique view for illustrating in detail the constitution of the top end portion of the flexible wiring substrate 32 shown in FIG. 3, and FIG. 6 is an A—A line sectional view of FIG. 5, for illustrating a manufacturing method of the substrate 32.

As will be apparent from these figures, according to this embodiment, the flexible wiring substrate 32 is formed on the metallic suspension 30 (and on the gimbal 31) made of for example stainless steel by directly laminating an insulating layer and conductive patterns on the upper surface of the suspension 30. Although various known methods can be applied to form such wiring substrate with laminated structure, a preferred manufacturing method is as follows.

First, a lower insulating layer 36 such as polyimide or PET is laminated on the whole upper surface of the suspension 30, and then this insulating layer 36 is patterned so as to eliminating a pattern corresponding to the grounding electrode 35 from the lower insulating layer 36. Then, a lower part of the grounding electrode 35 is formed by sputtering, plating or depositing conductive material such as copper on the surface of the suspension 30. The above-mentioned patterning may be carried out by spreading resist material on the insulating layer 36 or by covering the insulating layer 36 with a dry film, and then by patterning the spread resist material or the covered dry film in accordance with known methods. Thereafter, in the similar manner, conductor patterns of the signal lead conductors 34a to 34d and lower parts of the signal electrodes 33a to 33d are formed by sputtering, plating or depositing conductive material such as copper on the lower insulating layer 36. Simultaneously, a middle part of the grounding electrode 35 is formed in the similar manner.

Then, an upper insulating layer 37 such as polyimide or PET is laminated and then this insulating layer 37 is patterned so as to eliminating patterns corresponding to the signal electrodes 33a to 33d and the grounding electrode 35 from the lower insulating layer 37. Then, in the similar manner, conductor patterns of upper parts of the signal electrodes 33a to 33d and of a upper part of the grounding electrode 35 are formed by sputtering, plating or depositing conductive material such as copper. The upper surfaces of the signal electrodes 33a to 33d and the grounding electrode 35, which will be exposed from the surface of the wiring substrate 32, are preferably covered by plated nickel or gold.

The conductor patterns can be formed by laminating a film which has patterned lead conductors on an insulating layer if the width of the conductor patterns is relatively wide.

Figure 7:
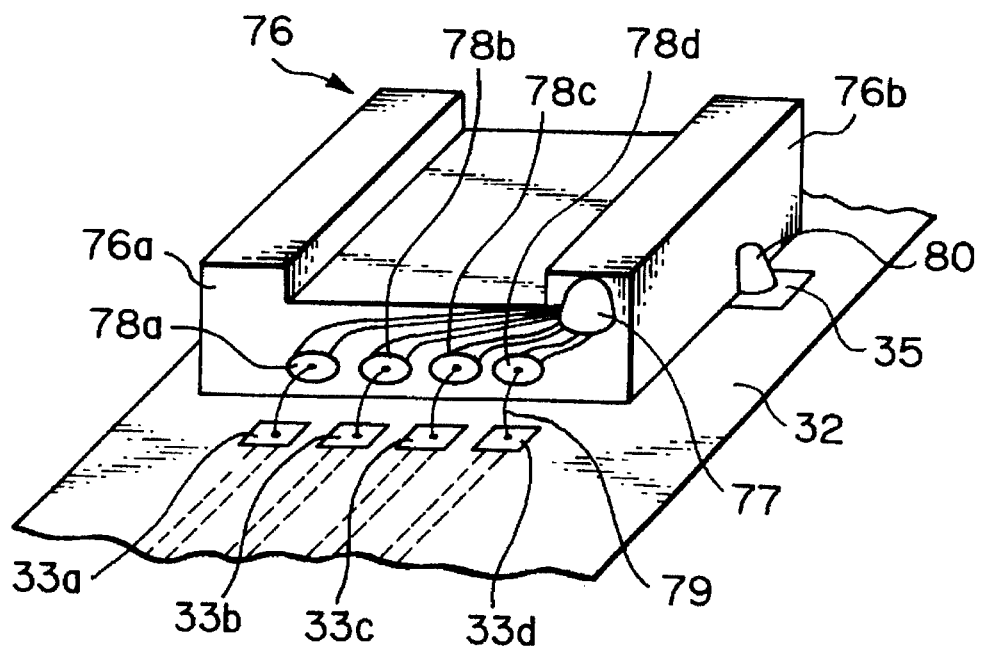
FIG. 7 is an oblique view showing a part of a magnetic head apparatus with a magnetic head slider mounted on the flexible wiring substrate in the embodiment of FIG. 3.

FIG. 7 is an oblique view illustrating a part of a magnetic head apparatus with a magnetic head slider mounted on the flexible wiring substrate 32 shown in FIG. 3.

In the figure, reference numeral 76 denotes the magnetic head slider made of conductive material such as $Al_2O_3$—TiC, 77 denotes a magnetic head transducer formed on the trailing surface 76a of the slider 76, and 78a to 78d denote signal terminals formed on the trailing surface 76a and electrically connected to the transducer 77, respectively.

The magnetic head slider 76 is bonded by means of an adhesive (not shown) on the upper surface of the flexible wiring substrate 32 which is formed on the gimbal 31 of the suspension 30. The signal terminals 78a to 78d of the slider 76 are connected to the signal electrodes 33a to 33d on the wiring substrate 32 by means of lead wires 79, respectively. A side surface 76b of the slider 76 is electrically connected to the grounding electrode 35 on the wiring substrate 32 by means of conductive resin 80 constituted by, for example, silver paste or carbon resin. Thus, the slider 76 is grounded via the conductive resin 80, the grounding electrode 35, and the suspension 30.

According to this embodiment, since the flexible wiring substrate 32 provided with the grounding electrode 35 is formed on the suspension 30 and the magnetic head slider 76 is mounted on the flexible wiring substrate 32, the slider 76 can be fixed to the suspension 30 and can be grounded without lying conductive resin on the adhesive surface of the slider 76 causing the mechanical strength of bonding of the slider to extremely increase. Also, since the flexible wiring substrate 32 can be positioned between the suspension 30 and the slider 78, arrangement of the wiring substrate 32 will be more freely determined resulting the design of the wiring substrate 32 to become easier.

Figure 8:
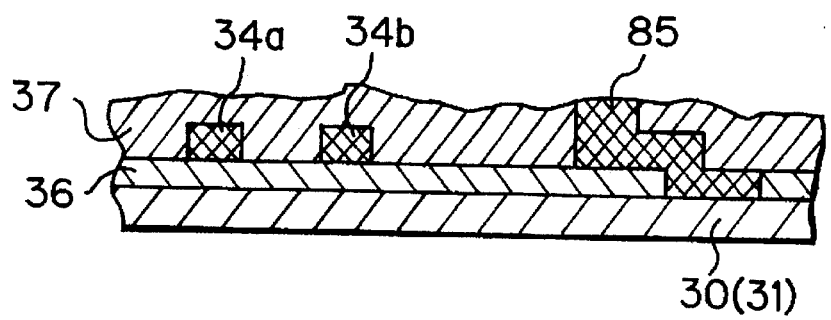
FIG. 8 is a sectional view showing an another example of a grounding electrode of the flexible wiring substrate.

FIG. 8 is a sectional view illustrating an another example of a grounding electrode of the flexible wiring substrate 32. In this figure, similar elements as these in FIG. 6 use the same reference numerals.

As will be apparent from FIG. 8, the grounding electrode 85 of this example is cranked toward a direction perpendicular to the surface of the suspension 30, while the grounding electrode 35 shown in FIG. 6 has a shape of linearly extending toward the direction perpendicular to the surface of the suspension 30. Therefore, the position of bottom end of this grounding electrode 85, which is in contact with the suspension 30, will not align with the position of the upper end thereof exposed from the wiring substrate 32. As a result, any pressure force from the slider 76 will not be directly applied to the bottom end surface of the grounding electrode 85, which is in contact with the suspension 30 causing this contacted end surface to be prevented from peeling off due to pressure.

Figure 9:
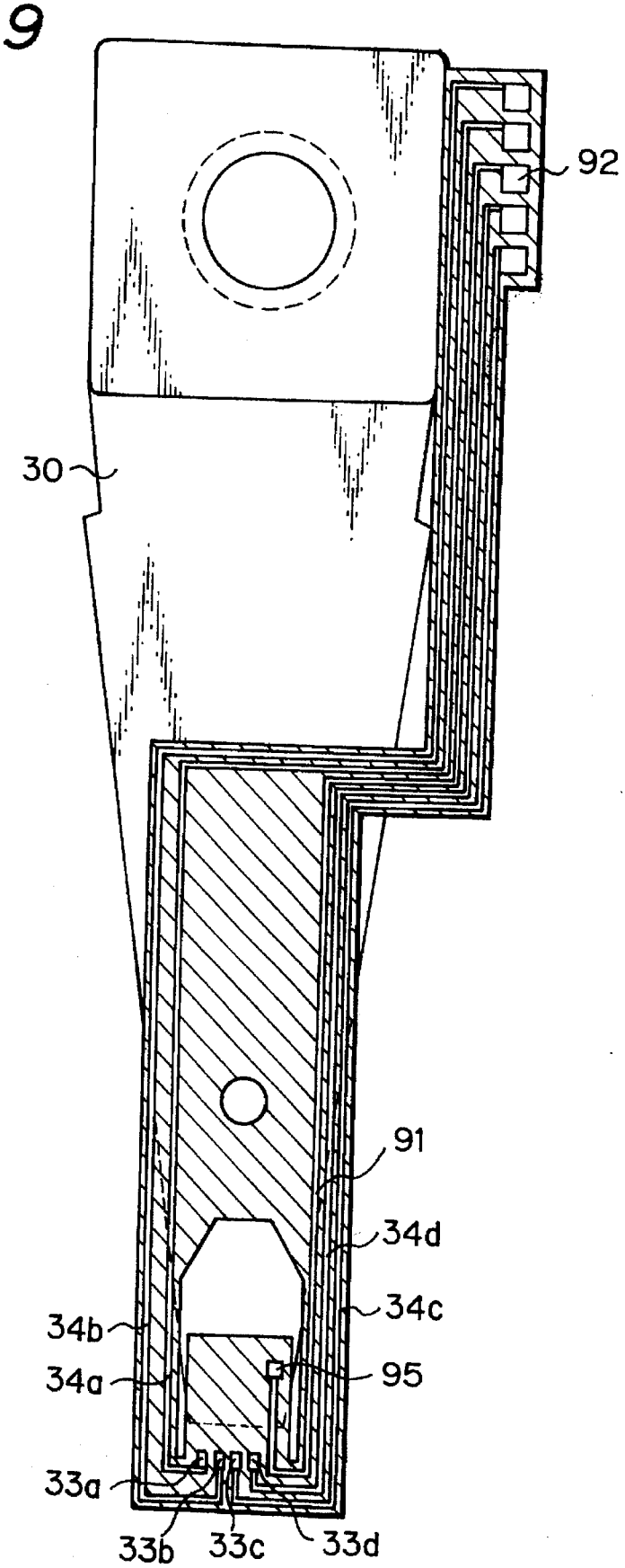
FIG. 9 is a plane view showing conductor patterns of a flexible wiring substrate in an another embodiment according to the present invention.

FIG. 9 is a plane view illustrating conductor patterns of a flexible wiring substrate in an another embodiment according to the present invention. In this figure, similar elements as these in FIG. 3 also use the same reference numerals.

As will be apparent from FIG. 9, according to this embodiment, a grounding electrode 95 is not electrically connected to the suspension 30 but electrically connected to a terminal 92 located at the base end portion of the suspension 30 via a grounding lead conductor 91. The terminal 92 will be grounded through a metal housing of a disk drive unit (not shown). According to this constitution, the magnetic head slider can be easily grounded even if the suspension 30 is made of non-conductive material such as synthetic resin. Another constitution and advantages of this embodiment are the same as these of the embodiment of FIG. 3.

Figure 10:
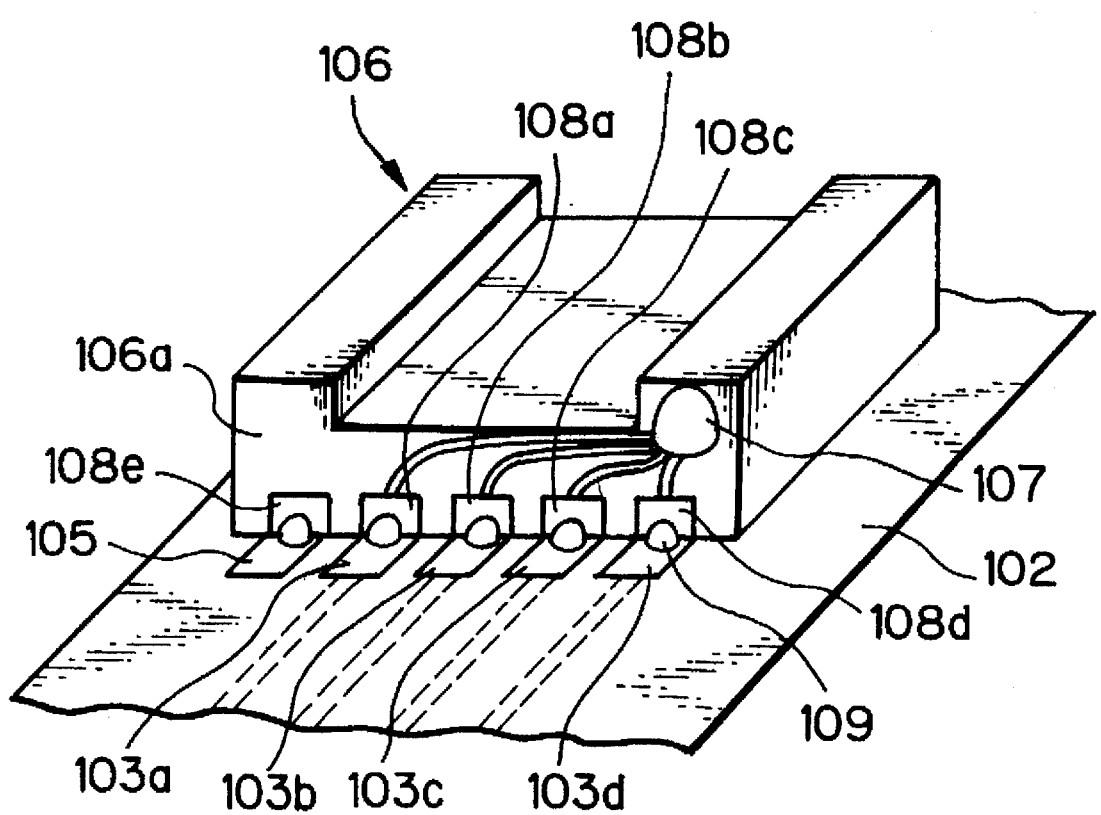
FIG. 10 is an oblique view showing a part of a magnetic head apparatus with a magnetic head slider mounted on a flexible wiring substrate in a further embodiment according to the present invention.

FIG. 10 is an oblique view illustrating a part of a magnetic head apparatus with a magnetic head slider mounted on a flexible wiring substrate in a further embodiment according to the present invention.

In the figure, reference numeral 106 denotes the magnetic head slider made of conductive material such as $Al_2O_3$—TiC, 107 denotes a magnetic head transducer formed on the trailing surface 106a of the slider 106, and 108a to 108d denote signal terminals formed on the trailing surface 106a and electrically connected to the transducer 107, respectively. On the trailing surface 106a, furthermore, a grounding terminal 108e which is electrically connected to the body of the slider 106 is formed.

On a flexible wiring substrate 102 which is formed on the gimbal of the suspension, not only signal electrodes 103a to 103d but also a grounding electrode 105 electrically connected to the metallic suspension are formed in alignment. This grounding electrode 105 may be shaped either as that shown in FIG. 6 or as that shown in FIG. 8.

The magnetic head slider 106 is bonded by means of an adhesive (not shown) on the upper surface of the flexible wiring substrate 102. The signal terminals 108a to 108d of the slider 106 are directly connected to the signal electrodes 103a to 103d on the wiring substrate 102 by for example ball bonding using gold balls 109, respectively. The grounding terminal 108e of the slider 106 is also directly connected to the grounding electrode 105 on the wiring substrate 102 by for example ball bonding using a gold ball. Thus, the slider 106 is grounded via the grounding terminal 108e, the grounding electrode 105, and the suspension.

According to this embodiment, since the flexible wiring substrate 102 provided with the grounding electrode 105 is formed on the suspension and the magnetic head slider 106 is mounted on the flexible wiring substrate 102, the slider 106 can be fixed to the suspension and can be grounded without lying conductive resin on the adhesive surface of the slider 106 causing the mechanical strength of bonding of the slider to extremely increase. Also, since the flexible wiring substrate 102 can be positioned between the suspension and the slider 106, arrangement of the wiring substrate 102 will be more freely determined resulting the design of the wiring substrate 102 to become easier. Furthermore, according to this embodiment, since the grounding electrode 105 is arranged to align with the signal electrodes 103a to 103d, connection between the grounding terminal 108e of the slider 106 and the grounding electrode 105 of the wiring substrate 102 can be carried out in the same process as the connection between the signal terminals 108a to 108d of the slider 106 and the signal electrodes 103a to 103d of the wiring substrate 102. Thus, the slider 106 can be grounded without inviting additional manufacturing process causing the manufacturing cost of the magnetic head apparatus to reduce.

Figure 11:
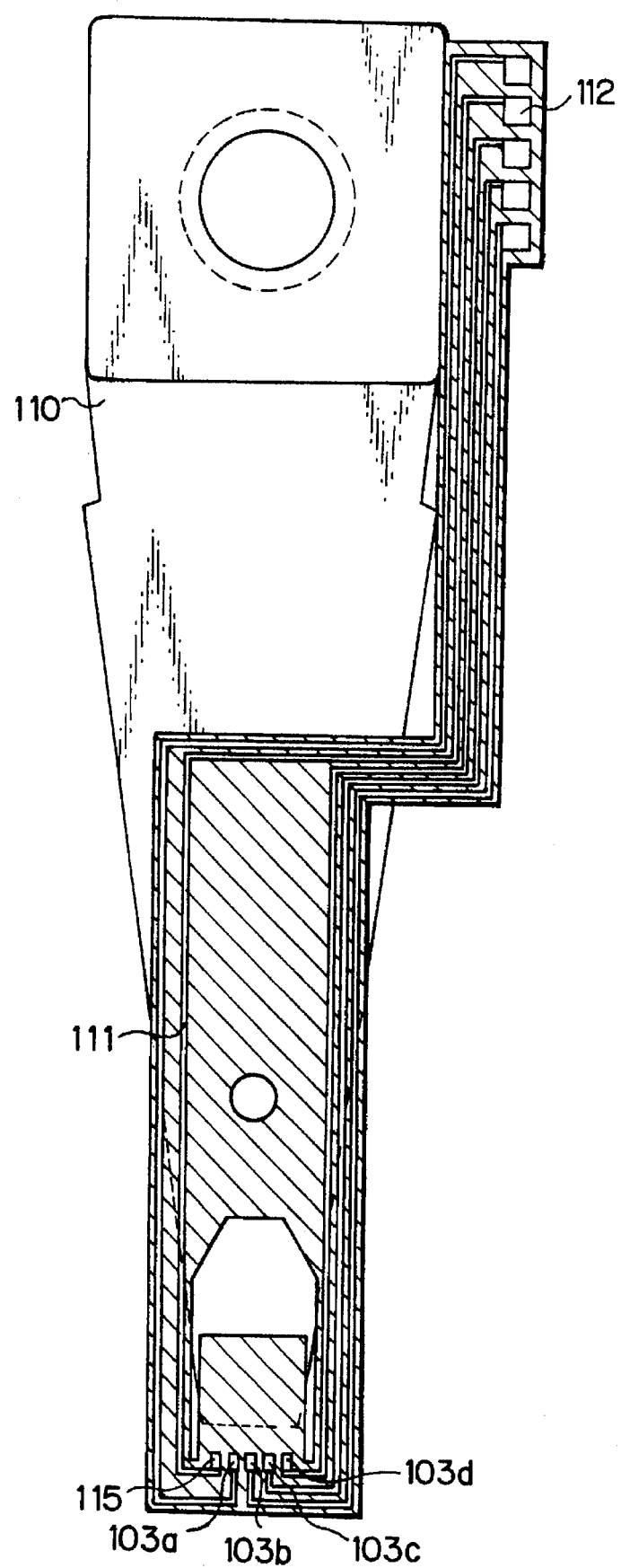
FIG. 11 is a plane view showing conductor patterns of a flexible wiring substrate in a still further embodiment according to the present invention.

FIG. 11 is a plane view illustrating conductor patterns of a flexible wiring substrate in a still further embodiment according to the present invention. In this figure, similar same elements as these in FIG. 10 use the same reference numerals.

As will be apparent from FIG. 11, according to this embodiment as well as that shown in FIG. 9, a grounding electrode 115 is not electrically connected to the suspension 110 but electrically connected to a terminal 112 located at the base end portion of the suspension 110 via a grounding lead conductor 111. The terminal 112 will be grounded through a metal housing of a disk drive unit (not shown). According to this constitution, the magnetic head slider can be easily grounded even when the suspension 110 is made of non-conductive material such as synthetic resin. Another constitution and advantages of this embodiment are the same as these of the embodiment of FIG. 10.

In the aforementioned embodiments of FIGS. 3 and 9, the signal electrodes 33a to 33d may be directly connected by for example ball bonding to the respective signal terminals of the slider as shown in FIG. 10. Also, in the aforementioned embodiments of FIGS. 10 and 11, the signal electrodes 103a to 103d may be connected to the respective signal terminals of the slider via lead wires as shown in FIG. 7.

Many widely different embodiments of the present invention may be constructed without departing from the spirit and scope of the present invention. It should be understood that the present invention is not limited to the specific embodiments described in the specification, except as defined in the appended claims.

What is claimed is:

1. A device for supporting a magnetic head slider having a trailing surface, a plurality of side surfaces other than said trailing surface and a bottom surface, at least one magnetic head transducer and a plurality of signal terminals connected to the transducer formed on said trailing surface, said device comprising:

a support member for supporting the magnetic head slider, said bottom surface of said slider being fixed to said support member by an adhesive;

a wiring substrate having a plurality of signal lead conductors to be electrically connected to said signal terminals of the magnetic head slider, said wiring substrate being formed on said support member; and a grounding electrode formed on said wiring substrate, said grounding electrode being arranged at a position near one of said side surfaces of the magnetic head slider so that at least a part of the grounding electrode is exposed outside said one side surface of the slider when the slider is mounted on the wiring substrate, said exposed part of the grounding electrode being electrically connected to said magnetic head slider via a conducting material which makes contact with said one side surface of the slider and said exposed part.

2. The device as claimed in claim 1, wherein at least a part of said support member is constituted by a grounded metal portion, and wherein said grounding electrode is electrically connected to said grounded metal portion.

3. The device as claimed in claim 1, wherein said support member has a base end portion, and wherein said wiring substrate includes a grounding lead conductor, one end of the grounding conductor being connected to said grounding electrode and the other end thereof being grounded at the base end portion of the support member.

4. The device as claimed in claim 1, wherein said magnetic head slider has a grounding terminal formed on said trailing surface and electrically connected to the slider, and wherein said grounding electrode is arranged at a position near said grounding terminal of said magnetic head slider when the slider is mounted on the wiring substrate.

5. A magnetic head apparatus comprising:

a magnetic head slider having a trailing surface, a plurality of side surfaces other than said trailing surface, a bottom surface, at least one magnetic head transducer and a plurality of signal terminals connected to the transducer formed on said trailing surface;

a support member for supporting said magnetic head slider, said bottom surface of said slider being fixed to said support member by an adhesive;

a wiring substrate having a plurality of signal lead conductors electrically connected to said signal terminals of the magnetic head slider, said wiring substrate being formed on said support member, said magnetic slider being mounted on said wiring substrate; and a grounding electrode formed on said wiring substrate, said grounding electrode being arranged at a position near one of said side surfaces of the magnetic head slider so that at least a part of the grounding electrode is exposed outside said one side surface of the slider when the slider is mounted on the wiring substrate, said exposed part of the grounding electrode being electrically connected to said one side surface of said magnetic head slider via a conducting material which makes contact with said one side surface of the slider and said exposed part.

6. The apparatus as claimed in claim 5, wherein at least a part of said support member is constituted by a grounded metal portion, and wherein said grounding electrode is electrically connected to said grounded metal portion.

7. The apparatus as claimed in claim 5, wherein said support member has a base end portion, and wherein said wiring substrate includes a grounding lead conductor, one end of the grounding conductor being connected to said grounding electrode and the other end thereof being grounded at the base end portion of the support member.

8. The apparatus as claimed in claim 5, wherein said magnetic head slider has a grounding terminal formed on said trailing surface and electrically connected to the slider, and wherein said grounding electrode is arranged at a position near said grounding terminal of said magnetic head slider.

9. The apparatus as claimed in claim 8, wherein said grounding terminal is directly connected to said grounding electrode.

* * * * *